US006795065B2

(12) United States Patent
    Kang

(10) Patent No.: US 6,795,065 B2
(45) Date of Patent: Sep. 21, 2004

(54) DISPLAY APPARATUS

(75) Inventor: Ho-Woong Kang, Yongin (KR)

(73) Assignee: Samsung Electronics Co., LTD, Suwon-si (KR)

( * ) Notice: Subject to any disclaimer, the term of this patent is extended or adjusted under 35 U.S.C. 154(b) by 350 days.

(21) Appl. No.: 09/983,815

(22) Filed: Oct. 26, 2001

(65) Prior Publication Data

US 2002/0191006 A1 Dec. 19, 2002

(30) Foreign Application Priority Data

Jun. 14, 2001 (KR) .......................................... 2001/33597

(51) Int. Cl.[7] .............................................. G09G 5/00
(52) U.S. Cl. ....................... 345/204; 345/690; 348/500
(58) Field of Search .............................. 345/10, 11, 20, 345/89, 90, 204, 609; 348/500, 516

(56) References Cited

U.S. PATENT DOCUMENTS

| | | | | |
|---|---|---|---|---|
| 4,298,890 A | * | 11/1981 | Lai et al. ...................... | 348/548 |
| 5,267,331 A | | 11/1993 | Siwoff | |
| 5,808,699 A | | 9/1998 | Tsujihara et al. | |
| 5,828,834 A | * | 10/1998 | Choi .......................... | 713/202 |
| 5,905,541 A | | 5/1999 | Yun | |
| 5,978,041 A | | 11/1999 | Masuda et al. | |
| 6,078,361 A | * | 6/2000 | Reddy ......................... | 348/558 |
| 6,288,690 B1 | * | 9/2001 | Byun .......................... | 345/10 |
| 6,295,095 B1 | | 9/2001 | Kawabata et al. | |
| 6,333,727 B2 | * | 12/2001 | Mizumaki ..................... | 345/89 |
| 6,337,695 B1 | * | 1/2002 | Bang .......................... | 345/690 |
| 6,473,134 B1 | | 10/2002 | Nohara et al. | |
| 6,654,065 B1 | * | 11/2003 | Sung .......................... | 348/525 |

FOREIGN PATENT DOCUMENTS

| | | | |
|---|---|---|---|
| EP | 0 814 607 A2 | 12/1997 | |
| JP | 07-115622 | 5/1995 | |
| JP | 9-44111 | 2/1997 | |
| JP | 9-120276 | 5/1997 | |
| JP | 10-126802 | 5/1998 | |
| JP | 10-136230 | 5/1998 | |
| JP | 10-210385 | 8/1998 | |
| JP | 2000-244843 | 9/2000 | |
| KR | 7-87391 | 3/1995 | |
| KR | 1998-4305 | 3/1998 | |
| WO | WO 99/55224 | * 11/1999 | ......... A61B/5/0245 |
| WO | WO 00/05877 | 2/2000 | |

OTHER PUBLICATIONS

European Search Report of the Application No. 01 30 7936 (dated Dec. 17, 2003).
Japanese Office Action of the Japanese Patent Application No. 2001–332361 (dated Jul. 31, 2003).

* cited by examiner

*Primary Examiner*—Amare Mengistu
(74) *Attorney, Agent, or Firm*—Robert E. Bushnell, Esq.

(57) ABSTRACT

A display apparatus having a display part, comprising an amplifying part amplifying an inputted picture signal and transmitting it to the display part; a clock signal generating part generating a clock signal in synchronization with at least one of vertical and horizontal synchronous signals transmitted together with the inputted picture signal; and a controller controlling the amplifying part to adjust an amplification rate so that brightness is alternately changed within a predetermined limit according to at least one of periods of the horizontal and vertical synchronous signals, synchronizing with the clock signal generated from the clock signal generating part. With this configuration, clear and bright moving pictures can be displayed, and the life span of the display apparatus can be lengthened.

17 Claims, 6 Drawing Sheets

DISPLAY APPARATUS

CLAIM OF PRIORITY

This application makes reference to, incorporates the same herein, and claims all benefits accruing under 35 U.S.C §119 from an application entitled Display Apparatus earlier filed in the Korean Industrial Property Office on Jun. 14, 2001, and there duly assigned Serial No. 2001-33597 by that Office.

BACKGROUND OF THE INVENTION

1. Field of the Invention

The present invention relates in general to a display apparatus, and more particularly, to a computer monitor which can display a clear moving picture and has a lengthened life span.

2. Description of the Related Art

Figure 5:
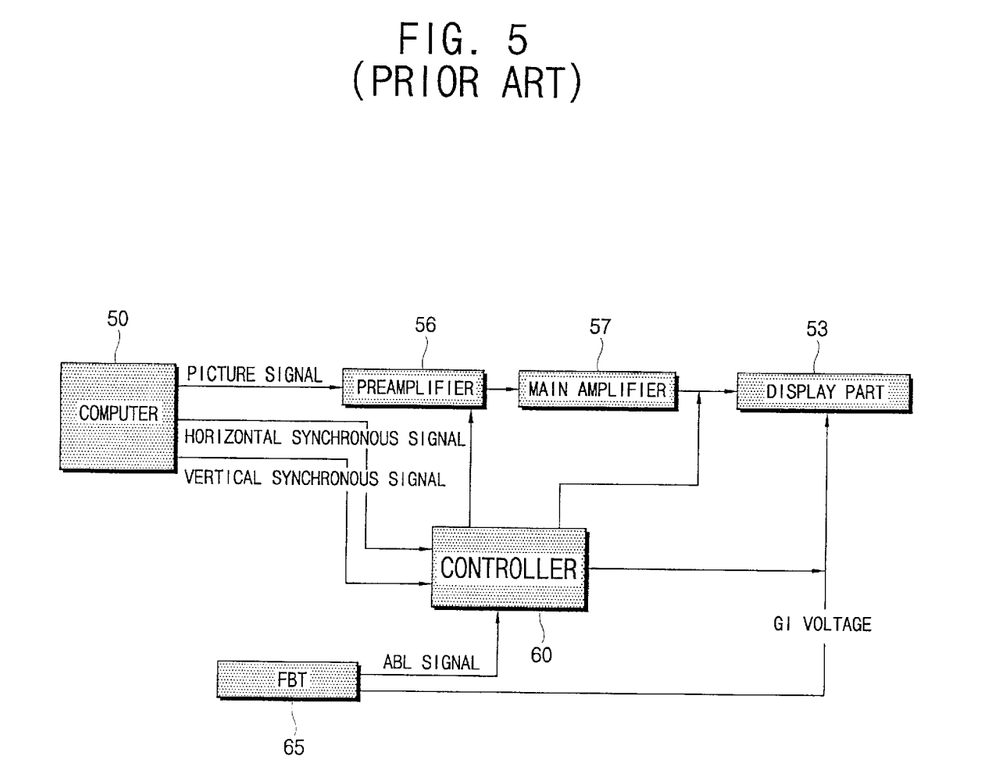
FIG. 5 is a block diagram of a conventional display apparatus.

Generally, as shown in FIG. 5, a display apparatus comprises a plurality of signal amplifiers 56 and 57 amplifying a picture signal from a computer 50, a display part 53 displaying the picture signal amplified by signal amplifiers 56 and 57, a flyback (fly back or fly-back) transformer (FBT) 65 generating an auto brightness limit (ABL) signal for controlling a magnitude of a gain of the picture signal by adjusting an electric current supplied to signal amplifiers 56 and 57 and supplying a high voltage (G1 voltage) to an electron gun, and a controller 60 generating vertical and horizontal blanking signals, according to the picture signal and vertical and horizontal synchronous signals received from computer 50.

Figure 6:
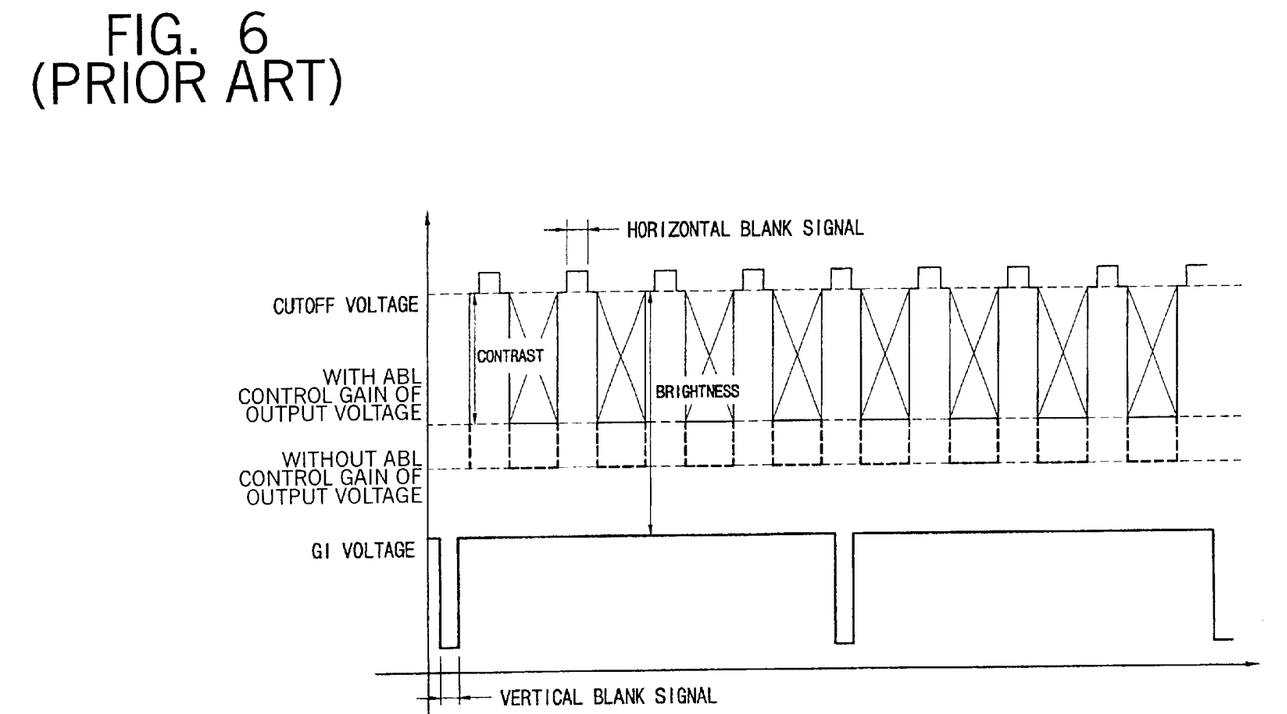
FIG. 6 is a graph showing an output waveform of the conventional picture signal.

As shown in FIG. 6, the display apparatus outputs a horizontal waveform signal through the signal amplifiers 56 and 57 and a vertical waveform signal with the G1 voltage. The gain of the horizontal waveform output voltage controls a contrast of the display apparatus. The higher the gain of the horizontal waveform output voltage is, the sharper the contrast is. Oppositely, the lower the gain of the horizontal waveform output voltage is, the weaker the contrast is. Brightness is controlled according to a difference between a horizontal cutoff voltage and the vertical G1 voltage. The smaller the voltage difference is, the higher the brightness is. Oppositely, the greater the voltage difference is, the lower the brightness is.

In comparison with a television set, the display apparatus is located relatively close to a user when in use and operated at a relatively high frequency. Thus, in order to lengthen a life span of the display apparatus and to protect the user's eyes, the contrast and the brightness of the display apparatus are generally set up with a relatively low value, compared with the television.

Accordingly, when the display apparatus is used to display a moving picture, it is neither clear nor bright, because of the low values of the contrast and brightness. Recently, various moving pictures are being supplied to a user, as the Internet becomes more popular. Thus, a user wants to watch clear and bright moving pictures, similar to the television.

Accordingly, a method has been provided which can display clear and bright moving pictures by raising a gain of a horizontal waveform output voltage so as to enhance the contrast or by raising the G1 voltage so as to enhance the brightness. However, if the gain of the horizontal waveform output voltage or the G1 voltage is raised, a circuit of the display apparatus is subjected to an overload, thereby shortening the life span of the display apparatus.

SUMMARY OF THE INVENTION

Accordingly, the present invention has been made keeping in mind the above-described shortcoming and user's need, and an object of the present invention is to provide a display apparatus which can display a clear and bright moving picture without shortening a life span of the display apparatus.

This and other objects of the present invention may be accomplished by the provision of a display apparatus having a display part, comprising an amplifying part amplifying an inputted picture signal and transmitting it to the display part; a clock signal generating part generating a clock signal in synchronization with at least one of the vertical and horizontal synchronous signals transmitted together with the inputted picture signal; and a controller controlling the amplifying part to adjust an amplification rate so that brightness is alternately changed within a predetermined limit according to at least one of the periods of the horizontal and vertical synchronous signals, synchronizing with the clock signal generated from the clock signal generating part.

Preferably, the display apparatus further comprises an electron gun emitting electron beams for displaying the inputted picture signal on the display part, and a FBT supplying high voltage to the electron gun; wherein the controller adjusts the output voltage from the FBT so that brightness is alternately changed within a predetermined limit in synchronization with the clock signal generated from the clock signal generating part.

Desirably, the controller adjusts the amplification rate of the amplifying part and voltage from the FBT in order to alternately change the brightness and contrast of the display part, according to the period of horizontal synchronous signal synchronizing with the clock signal generated from the clock signal generating part.

Preferably, the clock signal generating part includes a first signal generator generating a clock signal according to the horizontal synchronous signal of the picture signal, and a second signal generator generating a clock signal according to one of the vertical and horizontal synchronous signals of the picture signal.

The controller can adjust the contrast of the picture signal by increasing and decreasing the amplification rate of the amplifying part according to the period of the horizontal synchronous signal, synchronizing with the clock signal generated from the first signal generator.

The controller raises the voltage and increases the brightness for one period of the vertical synchronous signal synchronizing with the clock signal generated from the second signal generator, and lowers the voltage and decreases the brightness for the next period thereof.

The controller lowers the amplification rate of the amplifying part and makes the contrast weak for one period of the vertical synchronous signal, and raises the amplification rate of the amplifying part and makes the contrast sharp for the next period thereof.

The controller receives the clock signals generated from the first and second signal generators, and alternately increases and decreases the amplification rate of the amplifying part according to the period of the horizontal synchronous signal along with the voltage.

The controller raises the voltage so as to increase the brightness of the picture signal for every even turn of the period of the horizontal synchronous signal in one period of the vertical synchronous signal, and lowers the voltage so as to decrease the brightness of the picture signal for every even turn of the period of the horizontal synchronous signal in the next period of the vertical synchronous signal.

The controller decreases the amplification rate of the amplifying part so as to make the contrast for every even turn of the period of the horizontal synchronous signal in one period of the vertical synchronous signal, and increases the amplification rate of the amplifying part so as to make the contrast sharp for every even turn of the period of the horizontal synchronous signal in the next period of the vertical synchronous signal.

The controller respectively raises and increases the voltage and the amplification rate of the amplifying part so as to increase the brightness and to make the contrast of the picture signal sharp for every even turn of the period of the horizontal synchronous signal in one period of the vertical synchronous signal, and respectively lowers and decreases the voltage and the amplification rate of the amplifying part so as to decrease the brightness and to make the contrast of the picture signal weak for every even turn of the period of the horizontal synchronous signal in the next period of the vertical synchronous signal.

The display apparatus further comprises a selection part for selecting a moving picture mode; wherein the controller operates the signal generating part when the moving picture mode is selected through the selection part.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in more detail with reference to the accompanying drawings.

Figure 1:
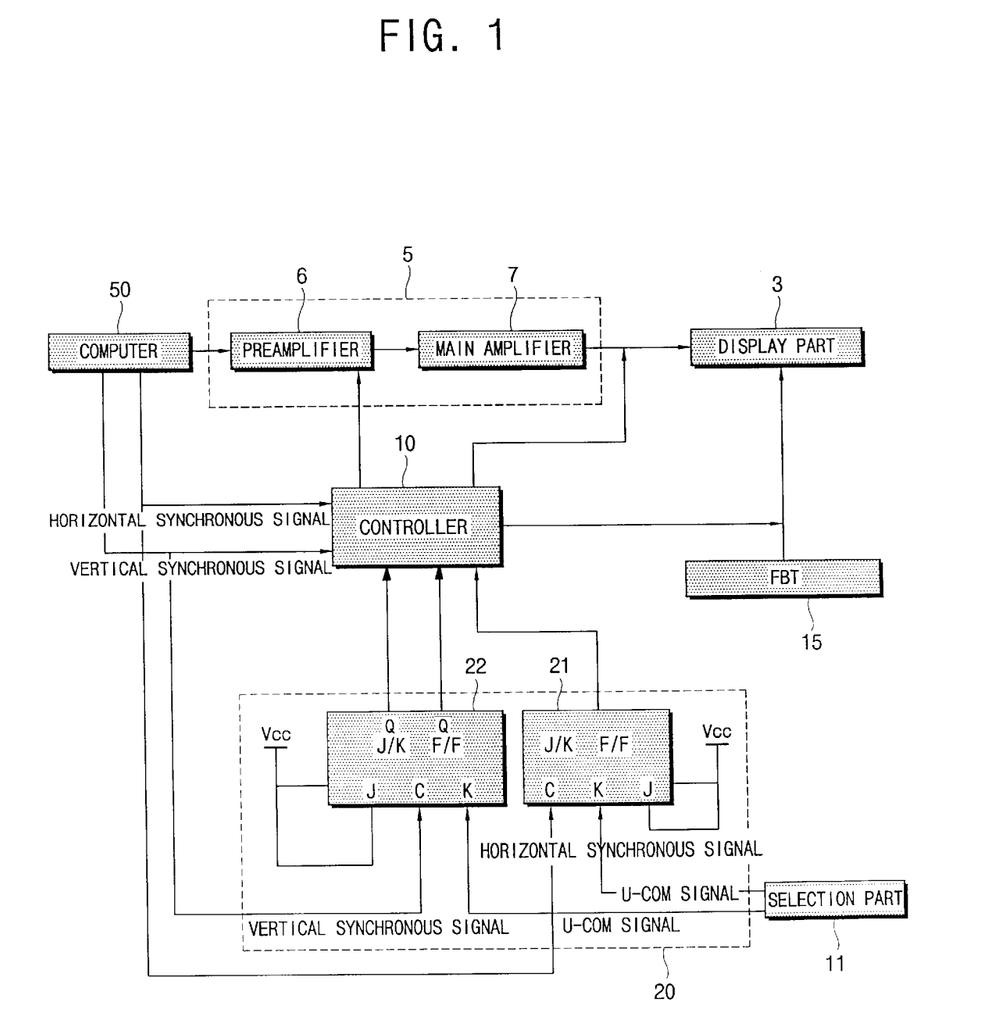
FIG. 1 is a block diagram of a display apparatus according to the present invention.

As shown in FIG. 1, a display apparatus according to the present invention comprises a display part 3 on which a picture signal from computer 50 is displayed, an amplifying part 5 amplifying the picture signal with a predetermined amplification rate, an FBT 15 supplying high voltage to an electron gun (not shown), a clock signal generating part 20 generating a clock signal in synchronization with at least one of the vertical and horizontal synchronous signals supplied together with the picture signal, and a controller 10 adjusting the brightness and contrast of the display part 3 by controlling output voltages from the amplifying part 5 and the FBT 15 when a moving picture signal is inputted and by controlling current supplied according to an ABL signal from the FBT 15.

Further, the display apparatus comprises a selection part 11 for selecting a moving picture display mode, allowing a picture to be clearer and brighter than a normal display mode. As the selection part 11, a separate key may be installed, or an existing key installed at the display apparatus to adjust an OSD (on screen display) may be used.

The amplifying part 5 includes a preamplifier 6 and a main amplifier 7 which are connected in sequence. The preamplifier 6 is a low voltage amplifier, which can amplify a low voltage picture signal into a predetermined voltage picture signal, according to a selection through the selection part 11 by a user. The preamplifier 6 amplifies the picture signal with two amplification rates according to the normal display mode and the moving picture display mode, and has a 5~7 times amplification rate at the normal display mode like an amplification rate of a conventional preamplifier and around 7 times amplification rate at the moving picture display mode.

On the other hand, the main amplifier 7 amplifies the picture signal amplified by the preamplifier 6 so as to have voltage which allows the picture signal to be displayed on the display part 3, and has an about 10 times amplification rate.

The clock signal generating part 20 includes first and second signal generators 21 and 22 respectively generating clock signals, according to the periods of the horizontal and vertical synchronous signals of the picture signal, and operates when the moving picture display mode is selected through the selection part 11.

The first signal generator 21 generates a clock signal to be supplied to the preamplifier 6, and the second signal generator 22 generates a clock signal to be supplied to the preamplifier 6 along with a clock signal to adjust the G1 voltage. To the first signal generator 21 are inputted the horizontal synchronous signal and a signal (u-COM) selected through the selection part 11, and to the second signal generator 22 are inputted the vertical synchronous signal and a signal (u-COM) selected through the selection part 11.

The controller 10, operating in response to the clock signal generator part 20, adjusts the brightness and contrast of the screen by controlling the G1 voltage of the electron gun and the preamplifier 6 according to the clock signals generated from the first and second signal generators 21 and 22, when the moving picture display mode is selected by a user through the selection part 11. At this time, the controller 10 can adjust the brightness and contrast of the screen according to the period of the horizontal synchronous signal, the period of the vertical synchronous signal, and the periods of both the horizontal and vertical synchronous signals.

Herein below, methods adjusting the picture signal according to the periods of the respective synchronous signals will be described by way of example.

Figure 2:
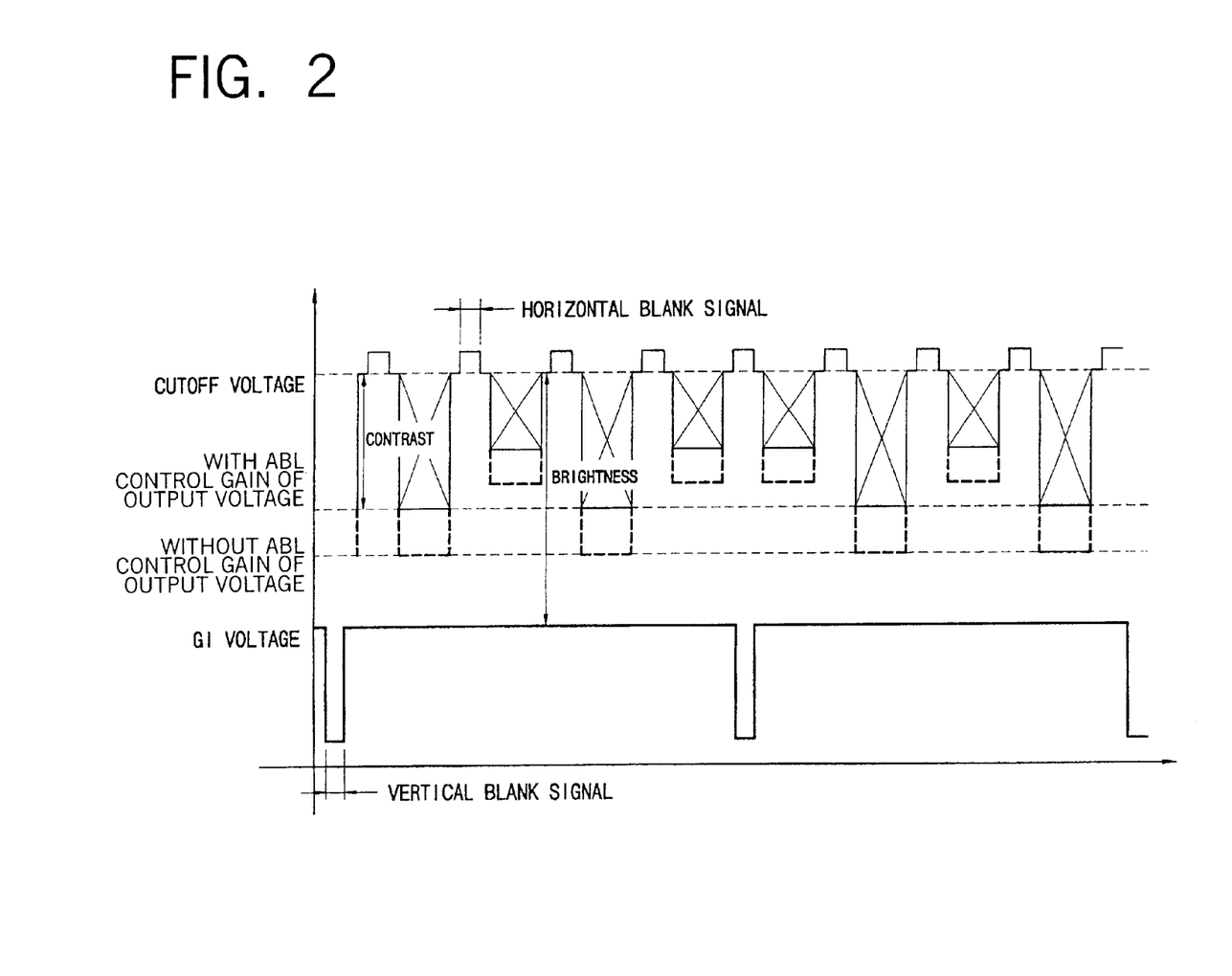
FIG. 2 is a graph showing an output waveform of the picture signal according to a first embodiment of a moving picture mode through the display apparatus of FIG. 1.

In the case of adjusting the picture signal according to the period of the horizontal synchronous signal, if the moving picture display mode is selected through the selection part 11, the first signal generator 21 generates the clock signal according to the period of the horizontal synchronous signal. The controller 10 transmits a control signal to the preamplifier 6 so as to alternately apply the respective amplification rates according to the normal display mode and the moving picture display mode by allowing the clock signal generated from the first signal generator 21 to be synchronous with the period of the horizontal synchronous signal. That is, the picture signal is amplified with the amplification rate according to the moving picture display mode for one period of the horizontal synchronous signal, and then the picture signal is amplified with the amplification rate according to the normal display mode for the next period of the horizontal synchronous signal. Thus, as shown in FIG. 2, the contrast is sharp for one period of the horizontal synchronous signal because a gain of the horizontal waveform output voltage is increased, but becomes weak for the next period of the horizontal synchronous signal because the gain of the horizontal waveform output voltage is decreased.

In the first frame, the controller 10 applies the amplification rate according to the moving picture display mode to every odd turn of the period, and the amplification rate according to the normal display mode to every even turn of the period. In the next frame, the controller applies the amplification rate according to the normal display mode to every odd turn of the period, and the amplification rate according to the moving picture display mode to every even turn of the period. As described above, the amplification rate is alternately increased and decreased according to the period of the horizontal synchronous signal, so that the contrast becomes totally sharp and the overload applied to components of the display apparatus is decreased.

Figure 3:
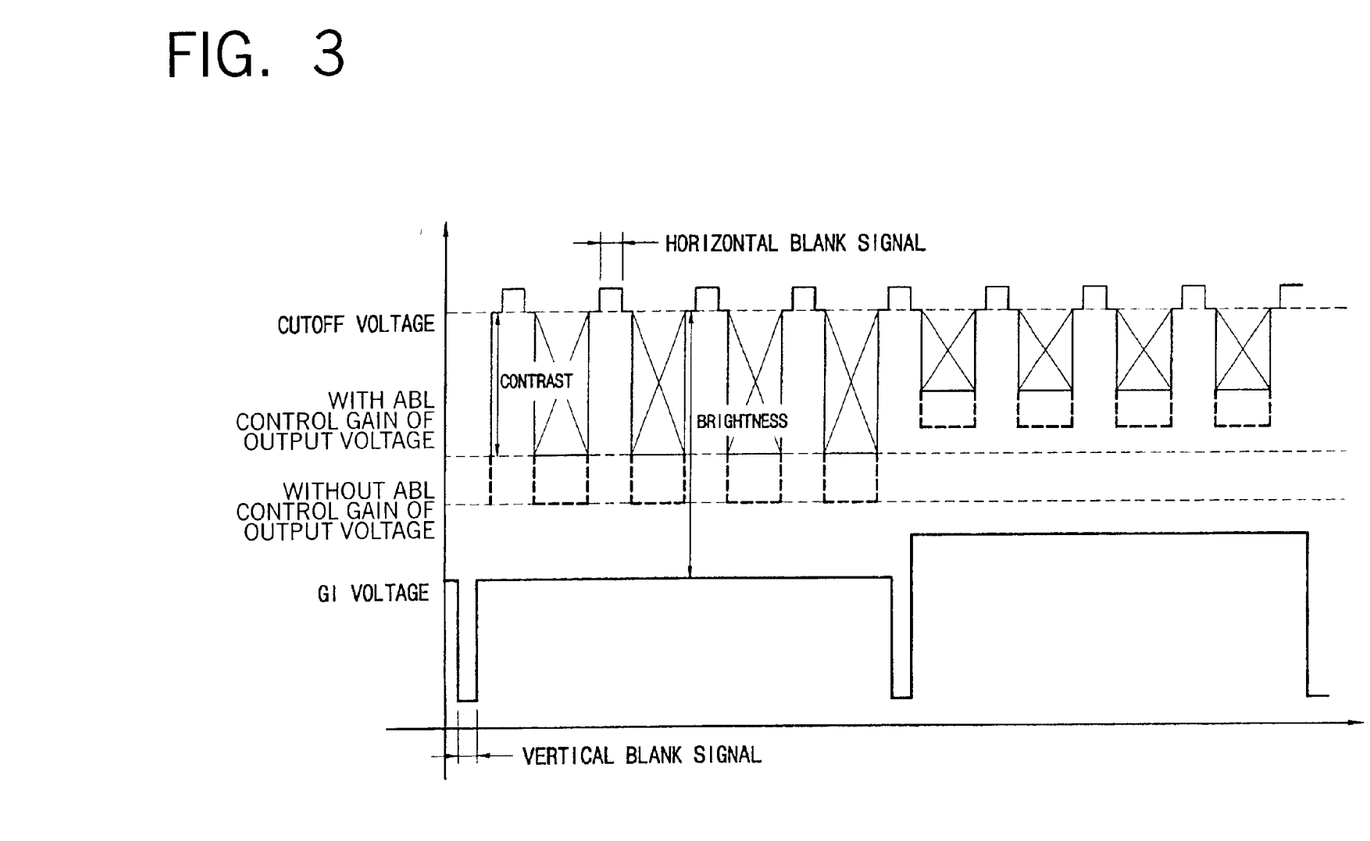
FIG. 3 is a graph showing an output waveform of the picture signal according to a second embodiment of the moving picture mode through the display apparatus of FIG. 1.

On the other hand, in the case of adjusting the picture signal according to the period of the vertical synchronous signal, the controller 10 operates in response to the clock signal from the second signal generator 22 to transmit the control signal to the preamplifier 6, and controls the voltage outputted from the FBT 15. That is, the controller 10 controls the G1 voltage outputted from the FBT 15 and the amplification rate of the preamplifier 6, according to the vertical synchronous signal.

For one period of the vertical synchronous signal, the controller 10 controls the FBT 15 to have the G1 voltage below a predetermined voltage and the preamplifier 6 to amplify the picture signal with the amplification rate according to the moving picture display mode. Thus, as shown in FIG. 3, a difference between the G1 voltage and the cutoff voltage is increased and the brightness is decreased, whereas the gain of the horizontal waveform output voltage is increased and the contrast becomes sharp.

When the one period of the vertical synchronous signal is over and the next frame comes, the controller 10 controls the FBT 15 to have the G1 voltage beyond a predetermined voltage and the preamplifier 6 to amplify the picture signal with the amplification rate according to the normal display mode, for the next period of the vertical synchronous signal. Thus, a difference between the G1 voltage and the cutoff voltage is decreased and the brightness is increased, whereas the gain of the horizontal waveform output voltage is decreased and the contrast becomes weak.

That is, as shown in FIG. 3, if the picture signal is adjusted according to the period of the vertical synchronous signal by means of only the second signal generator 22, the contrast is sharp for one period of the vertical synchronous signal, i.e., one frame, and the brightness is increased for the next period of the vertical synchronous signal.

Figure 4:
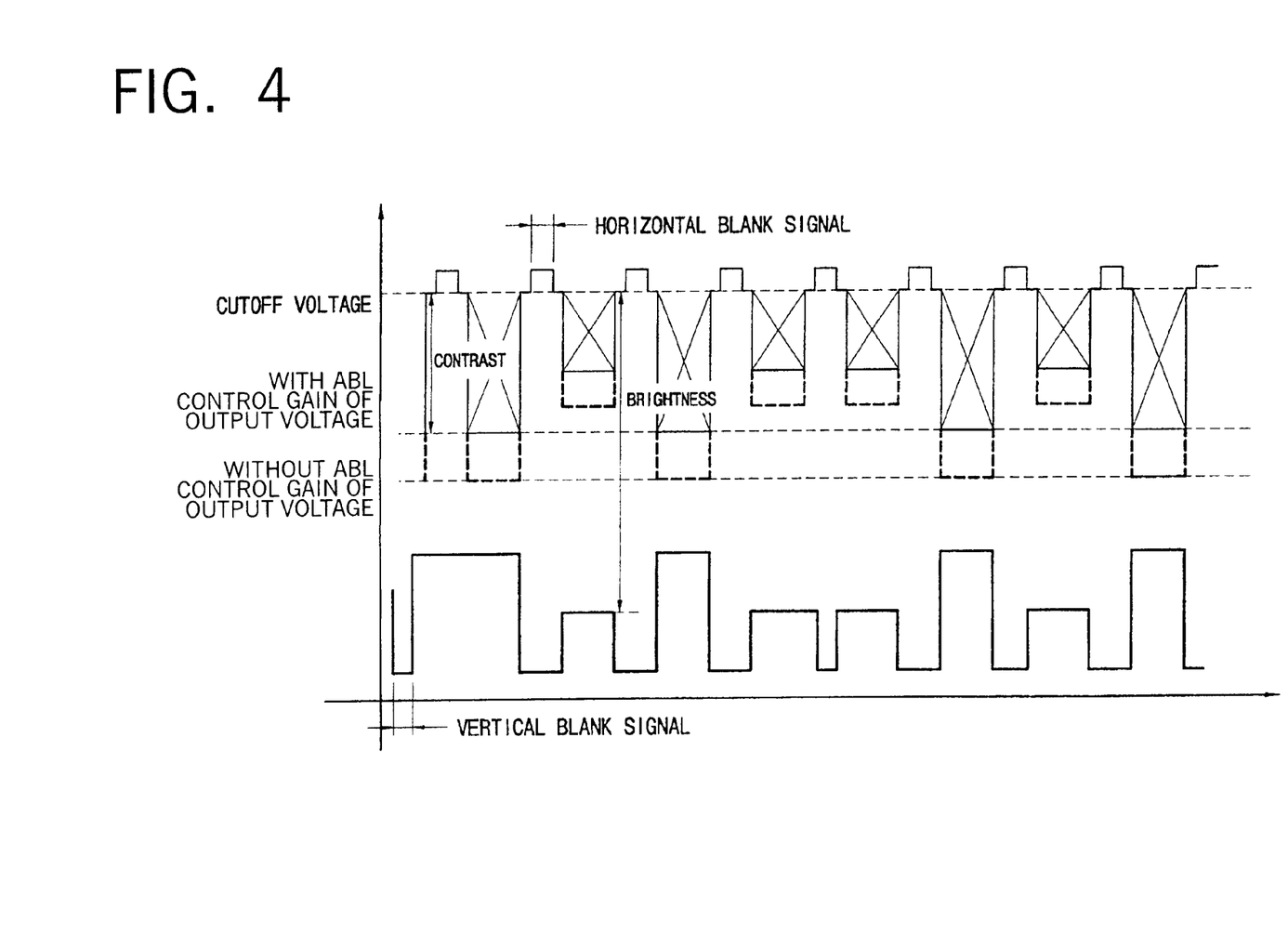
FIG. 4 is a graph showing an output waveform of the picture signal according to a third embodiment of the moving picture mode through the display apparatus of FIG. 1.

On the other hand, in the case of adjusting the picture signal according to the periods of both the horizontal and vertical synchronous signals, the controller 10 generates the clock signals in response to both the first and the second signal generators 21 and 22. Accordingly, as shown in FIG. 4, the controller 10 controls the preamplifier 6 with the clock signal from the first signal generator 21 for every period of the horizontal synchronous signal and the G1 voltage from the FBT 15 with the clock signal from the second signal generator 22 for every period of the vertical synchronous signal.

That is, the controller 10 controls the preamplifier 6 to alternately apply the amplification rates, according to the normal display mode and the moving picture display mode, to every period of the horizontal synchronous signal. Then, the preamplifier 6 amplifies the picture signal with the amplification rate according to the moving picture display mode for one period of the horizontal synchronous signal and with the amplification rate according to the normal display mode for the next period of the horizontal synchronous signal. Thus, as shown in FIG. 4, the gain of the horizontal waveform output voltage is increased because the moving picture display mode is applied for one period of the horizontal synchronous signal, so that the contrast becomes sharp. Oppositely, the gain of the horizontal waveform output voltage is decreased because the normal display mode is applied for the next period of the horizontal synchronous signal, so that the contrast becomes weak.

Further, the controller 10 controls the G1 voltage outputted from the FBT 15 with the clock signal from the second signal generator 22. At this time, the controller 10 does not control the G1 voltage outputted from the FBT 15 according to the vertical synchronous signal, but according to the horizontal synchronous signal. The controller 10 raises the G1 voltage and increases the brightness for the one period of the horizontal synchronous signal during which the contrast becomes sharp according as the gain of the output voltage is increased by the preamplifier 6, and lowers the G1 voltage and decreases the brightness for the next period of the horizontal synchronous signal during which the contrast becomes weak as the gain of the output voltage is decreased by the preamplifier 6.

Therefore, in the first frame, the contrast becomes sharp and the brightness is increased as the gain of the output voltage and the G1 voltage are raised for every odd period of the horizontal synchronous signal, and the contrast becomes weak and the brightness is decreased for every even period of the horizontal synchronous signal. In the second frame, the contrast becomes weak and the brightness is increased for every odd period of the horizontal synchronous signal, and the contrast becomes sharp and the brightness is decreased for every even period of the horizontal synchronous signal.

In addition, an embodiment in FIG. 4 shows that the contrast becomes sharp and the brightness is increased according to the period of the horizontal synchronous signal, but the contrast and the brightness may be respectively weak and increased, or sharp and decreased.

With this configuration, according to the present invention, it is provided the clock signal generator 20 generating the clock signal according to the period of the horizontal or vertical synchronous signal, and the amplification rate of the preamplifier 6 and the G1 voltage of the FBT 15 are adjusted in synchronization with the clock signal generated from the clock signal generator, thereby allowing the contrast and the brightness to be alternately adjusted according to the period of the horizontal or vertical synchronous signal. Thus, the picture on the screen is clearly and brightly displayed at the moving picture display mode. Moreover, the contrast and the brightness are alternately adjusted according to the periods of the horizontal and the vertical synchronous signals, thereby decreasing overload supplied to the circuits and the components of the display apparatus. Therefore, it is possible to prevent a life span of the display apparatus from being shortened.

In the above description, in order to control the picture signal with the horizontal synchronous signal, the amplification rate of the preamplifier 6 is adjusted. However, an ABL circuit may be employed for controlling the picture signal.

As described above, according to the present invention, clear and bright moving pictures can be displayed, and the life span of the display apparatus can be lengthened.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A display apparatus having a display part, comprising:
    an amplifying part amplifying an inputted picture signal and transmitting it to the display part;
    a clock signal generating part generating a clock signal in synchronization with at least one of vertical and horizontal synchronous signals transmitted together with the inputted picture signal; and
    a controller, synchronously with the clock signal generated from the clock signal generating part, controlling the amplifying part to adjust an amplification rate so that brightness is alternately changed within a predetermined limit according to at least one of periods of the horizontal and vertical synchronous signals.

2. The display apparatus according claim 1, further comprising an electron gun emitting electron beams for displaying the inputted picture signal on the display part, and a flyback transformer (FBT) supplying high voltage to the electron gun;
    wherein the controller adjusts output voltage from the FBT so that brightness is alternately changed within a predetermined limit in synchronization with the clock signal generated from the clock signal generating part.

3. The display apparatus according claim 2, wherein the controller adjusts the amplification rate of the amplifying part and voltage from the FBT in order to alternately change the brightness and contrast of the display part, according to the period of horizontal synchronous signal in synchronization with the clock signal generated from the clock signal generating part.

4. The display apparatus according to claim 1, wherein the clock signal generating part includes a first signal generator generating a clock signal according to the horizontal synchronous signal of the picture signal, and a second signal generator generating a clock signal according to one of the vertical and horizontal synchronous signals of the picture signal.

5. The display apparatus according to claim 4, wherein the controller adjusts the contrast of the picture signal by increasing and decreasing the amplification rate of the amplifying part according to the period of the horizontal synchronous signal in synchronization with the clock signal generated from the first signal generator.

6. The display apparatus according to claim 5, wherein the controller raises the voltage and increases the brightness for one period of the vertical synchronous signal in synchronization with the clock signal generated from the clock signal generating part, and lowers the voltage and decreases the brightness for the next period thereof.

7. The display apparatus according to claim 6, wherein the controller lowers the amplification rate of the amplifying part and makes the contrast weak for one period of the vertical synchronous signal, and raises the amplification rate the amplifying part and make the contrast sharp for the next period thereof.

8. The display apparatus according to claim 7, wherein the controller receives the clock signals generated from the first and second signal generators, and alternately increases and decreases the amplification rate of the amplifying part according to the period of the horizontal synchronous signal along with the voltage.

9. The display apparatus according to claim 8, wherein the controller raises the voltage so as to increase the brightness of the picture signal for every even turn of the period of the horizontal synchronous signal in one period of the vertical synchronous signal, and lowers the voltage so as to decrease the brightness of the picture signal for every even turn of the period of the horizontal synchronous signal in the next period of the vertical synchronous signal.

10. The display apparatus according to claim 9, wherein the controller decreases the amplification rate of the amplifying part so as to make the contrast for every even turn of the period of the horizontal synchronous signal in one period of the vertical synchronous signal, and increases the amplification rate of the amplifying part so as to make the contrast sharp for every even turn of the period of the horizontal synchronous signal in the next period of the vertical synchronous signal.

11. The display apparatus according to claim 8, wherein the controller respectively raises and increases the voltage and the amplification rate of the amplifying part so as to increase the brightness and to make the contrast of the picture signal sharp for every even turn of the period of the horizontal synchronous signal in one period of the vertical synchronous signal, and respectively lowers and decreases the voltage and the amplification rate of the amplifying part so as to decrease the brightness and to make the contrast of the picture signal weak for every even turn of the period of the horizontal synchronous signal in the next period of the vertical synchronous signal.

12. The display apparatus according to claim 1, further comprising a selection part for selecting between a normal display mode and a moving picture display mode;
    wherein the controller operates in response to the signal generating part when the moving picture display mode is selected through the selection part.

13. A method of adjusting a picture signal in a display apparatus, comprising the steps of:
    selecting a normal display mode or a moving picture display mode;
    amplifying the picture signal according to a first amplification rate, when the normal display mode is selected; and
    alternately amplifying the picture signal according to a second amplification rate, to increase the gain of a horizontal synchronous signal, and said first amplification rate, to decrease the gain of the horizontal synchronous signal, when the moving picture display mode is selected, said picture signal having a sharpened contrast when the gain of the horizontal synchronous signal is increased.

14. The method as set forth in claim 13, wherein the step of alternately amplifying the picture signal comprises:
    amplifying, in a first frame, each odd horizontal synchronous signal according to the second amplification rate and each even horizontal synchronous signal according to the first amplification rate; and
    amplifying, in a second frame, each odd horizontal synchronous signal according to the first amplification rate and each even horizontal synchronous signal according to the second amplification rate.

15. The method as set forth in claim 13, wherein the step of alternately amplifying the picture signal comprises:

amplifying, in a first frame, each horizontal synchronous signal according to the second amplification rate and controlling a flyback transformer to output a grid (G1) voltage below a predetermined voltage to decrease the brightness of the picture signal; and amplifying, in a second frame, each horizontal synchronous signal according to the first amplification rate controlling the flyback transformer to output the grid (G1) voltage above said predetermined voltage to increase the brightness of the picture signal.

16. The method as set forth in claim 13, wherein the step of alternately amplifying the picture signal comprises:

amplifying, in a first frame, each odd horizontal synchronous signal according to the second amplification rate while controlling a flyback transformer to output a grid (G1) voltage above a predetermined voltage to increase the brightness of the picture signal synchronously with each odd horizontal synchronous signal;

amplifying, in said first frame, each even horizontal synchronous signal according to the first amplification rate while controlling said flyback transformer to output the grid (G1) voltage below said predetermined voltage to decrease the brightness of the picture signal synchronously with each even horizontal synchronous signal;

amplifying, in a second frame, each odd horizontal synchronous signal according to the first amplification rate while controlling said flyback transformer to output the grid (G1) voltage below the predetermined voltage to decrease the brightness of the picture signal synchronously with each odd horizontal synchronous signal; and amplifying, in said second frame, each even horizontal synchronous signal according to the second amplification rate while controlling said flyback transformer to output the grid (G1) voltage above the predetermined voltage to increase the brightness of the picture signal synchronously with each even horizontal synchronous signal.

17. The method as set forth in claim 13, wherein the step of alternately amplifying the picture signal comprises:

amplifying, in a first frame, each odd horizontal synchronous signal according to the second amplification rate while controlling a flyback transformer to output a grid (G1) voltage below a predetermined voltage to decrease the brightness of the picture signal synchronously with each odd horizontal synchronous signal;

amplifying, in said first frame, each even horizontal synchronous signal according to the first amplification rate while controlling said flyback transformer to output the grid (G1) voltage above said predetermined voltage to increase the brightness of the picture signal synchronously with each even horizontal synchronous signal;

amplifying, in a second frame, each odd horizontal synchronous signal according to the first amplification rate while controlling said flyback transformer to output the grid (G1) voltage above the predetermined voltage to increase the brightness of the picture signal synchronously with each odd horizontal synchronous signal; and amplifying, in said second frame, each even horizontal synchronous signal according to the second amplification rate while controlling said flyback transformer to output the grid (G1) voltage below the predetermined voltage to decrease the brightness of the picture signal synchronously with each even horizontal synchronous signal.

* * * * *